(12) United States Patent
Kates

(10) Patent No.: US 7,347,384 B2
(45) Date of Patent: Mar. 25, 2008

(54) MULTI-ZONE SPRINKLER SYSTEM WITH MOISTURE SENSORS AND CONFIGURABLE SPRAY PATTERN

(76) Inventor: Lawrence Kates, 1111 Bayside Dr., Corona Del Mar, CA (US) 92625

( * ) Notice: Subject to any disclaimer, the term of this patent is extended or adjusted under 35 U.S.C. 154(b) by 0 days.

(21) Appl. No.: 11/620,587

(22) Filed: Jan. 5, 2007

(65) Prior Publication Data

US 2007/0102538 A1    May 10, 2007

Related U.S. Application Data

(63) Continuation of application No. 11/152,037, filed on Jun. 14, 2005, now Pat. No. 7,168,632.

(51) Int. Cl.
*B05B 12/12* (2006.01)
*B05B 17/04* (2006.01)
*B05B 3/00* (2006.01)
*B05B 3/02* (2006.01)
*A01G 27/00* (2006.01)
*A01G 25/00* (2006.01)

(52) U.S. Cl. ............................. 239/63; 239/11; 239/69; 239/225.1; 239/DIG. 1; 239/DIG. 15; 137/78.3

(58) Field of Classification Search .................. 239/69, 239/63, 67, DIG. 1, DIG. 15, 66, 70, 7, 64, 239/542, 11, 225.1, 200; 137/78.3, 78.2; 700/284

See application file for complete search history.

(56) References Cited

U.S. PATENT DOCUMENTS

| | | | |
|---|---|---|---|
| 4,852,802 A | 8/1989 | Iggulden et al. | |
| 4,892,113 A | 1/1990 | Fattahi | |
| 4,993,640 A | 2/1991 | Baugh | |
| 5,348,227 A | 9/1994 | Polonsky | |
| 5,465,904 A | 11/1995 | Vaello | |
| 7,168,632 B2 | 1/2007 | Kates | |
| 2004/0026529 A1 | 2/2004 | Float et al. | |
| 2005/0090936 A1 | 4/2005 | Hitt et al. | |
| 2005/0187665 A1 | 8/2005 | Fu | |
| 2005/0199842 A1 | 9/2005 | Parsons et al. | |
| 2006/0278728 A1 | 12/2006 | Kates | |

OTHER PUBLICATIONS

Office Action dated May 11, 2006 from Related U.S. Appl. No. 11/152,037.
Office Action dated Sep. 7, 2006 from Related U.S. Appl. No. 11/152,037.
Notice of Allowance dated Nov. 24, 2006 from Related U.S. Appl. No. 11/152,037.

*Primary Examiner*—Darren Gorman
(74) *Attorney, Agent, or Firm*—Knobbe, Martens, Olson & Bear, LLP

(57) ABSTRACT

An irrigation system comprises sprinkler heads with an electrically configurable spray pattern, moisture sensors, and a controller. Based upon input signals from the moisture sensors, the controller dynamically configures the spray pattern of the sprinkler head to allow more water to fall on areas that need to be watered and less water to fall on areas that do not require additional water. The irrigation system can additionally comprise fire sensors. Based upon input from the fire sensors, the controller activates the sprinklers.

23 Claims, 6 Drawing Sheets

MULTI-ZONE SPRINKLER SYSTEM WITH MOISTURE SENSORS AND CONFIGURABLE SPRAY PATTERN

REFERENCE TO RELATED APPLICATIONS

This application is a continuation of application Ser. No. 11/152,037, filed Jun. 14, 2005, titled "MULTI-ZONE SPRINKLER SYSTEM WITH MOISTURE SENSORS AND CONFIGURABLE SPRAY PATTERN," the entire contents of which is hereby incorporated by reference.

BACKGROUND OF THE INVENTION

1. Field of the Invention

The invention relates generally to landscape sprinkler systems and more particularly to landscape sprinkling systems and methods having a computer configured spray pattern.

2. Description of the Related Art

In the past, it has been a well-known practice to provide automatic watering devices, such as sprinklers, in order to supply plants with a proper amount of moisture so that the plants will flourish. Homeowners and commercial establishments, such as golf courses, recreational parks, and farms, use automatic watering systems.

A conventional system employs a timer controller, which operates a solenoid valve incorporated into a water system so that when the time as arbitrarily set by the user arrives, power is supplied via the solenoid to the water supply valve so that water is then supplied to a system of sprinklers or other irrigation devices. However, the sprinkler system supplies water even though the ground or plant medium is saturated such as after a heavy rain or the like.

For example, an area or zone requiring irrigation may contain thin sandy soil with low water holding capacity from which water drains easily. Another zone may contain a deeper sand, clay and silt mixture, which drains slowly and holds water for a longer period. If the irrigator applies water uniformly at a rate equal to the average required over the area, the user is faced with the dilemma of having too little water in one zone and too much in the other. In practice, the user typically irrigates the entire area at the rate required for the most deficient soil, which wastes water in the zones, which do not require additional water. As the cost of water increases, this creates an unnecessary expense for the user.

SUMMARY OF THE INVENTION

In one embodiment, an irrigation system includes sprinkler heads with an electrically-configurable spray pattern, moisture sensors, and a controller. Based upon input signals from the moisture sensors, the controller dynamically configures the spray pattern of the sprinkler head to allow more water to fall on areas that need to be watered and less water to fall on areas that do not require additional water.

In another embodiment, the irrigation system additionally includes fire sensors. Based upon input from the fire sensors, the controller activates the sprinklers.

In one embodiment, a rotating sprinkler head includes at least one solenoid, having a first state and a second state. The amount of water the sprinkler sprinkles is dependent on the rate of rotation of the sprinkler as it travels through an arc. In one embodiment, the arc is a circle. In one embodiment, the sprinkler head rotates relatively slowly when the solenoid is in the first state, and rotates relatively quickly when the solenoid is in the second state. When the sprinkler head rotates more slowly, the ground surrounding the sprinkler in the arc of slow rotation receives more water than the ground surrounding the sprinkler head in the arc of fast rotation. In one embodiment, the first state is an active state and the second state is an inactive state. In another embodiment, the first state is the inactive state and the second state is the active state.

In one embodiment, a stationary sprinkler head includes at least one solenoid having a first state and a second state and a water outlet port associated at least one solenoid. When the solenoid is in the first state, water outlet port is open, allowing the flow of water. When the solenoid is in the second state, the water outlet port closes, inhibiting the flow of water. In one embodiment, the first state is an active state and the second state is an inactive state. In another embodiment, the first state is the inactive state and the second state is the active state.

For purposes of summarizing the invention, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

DETAILED DESCRIPTION OF THE PREFERRED EMBODIMENT

Figure 1:
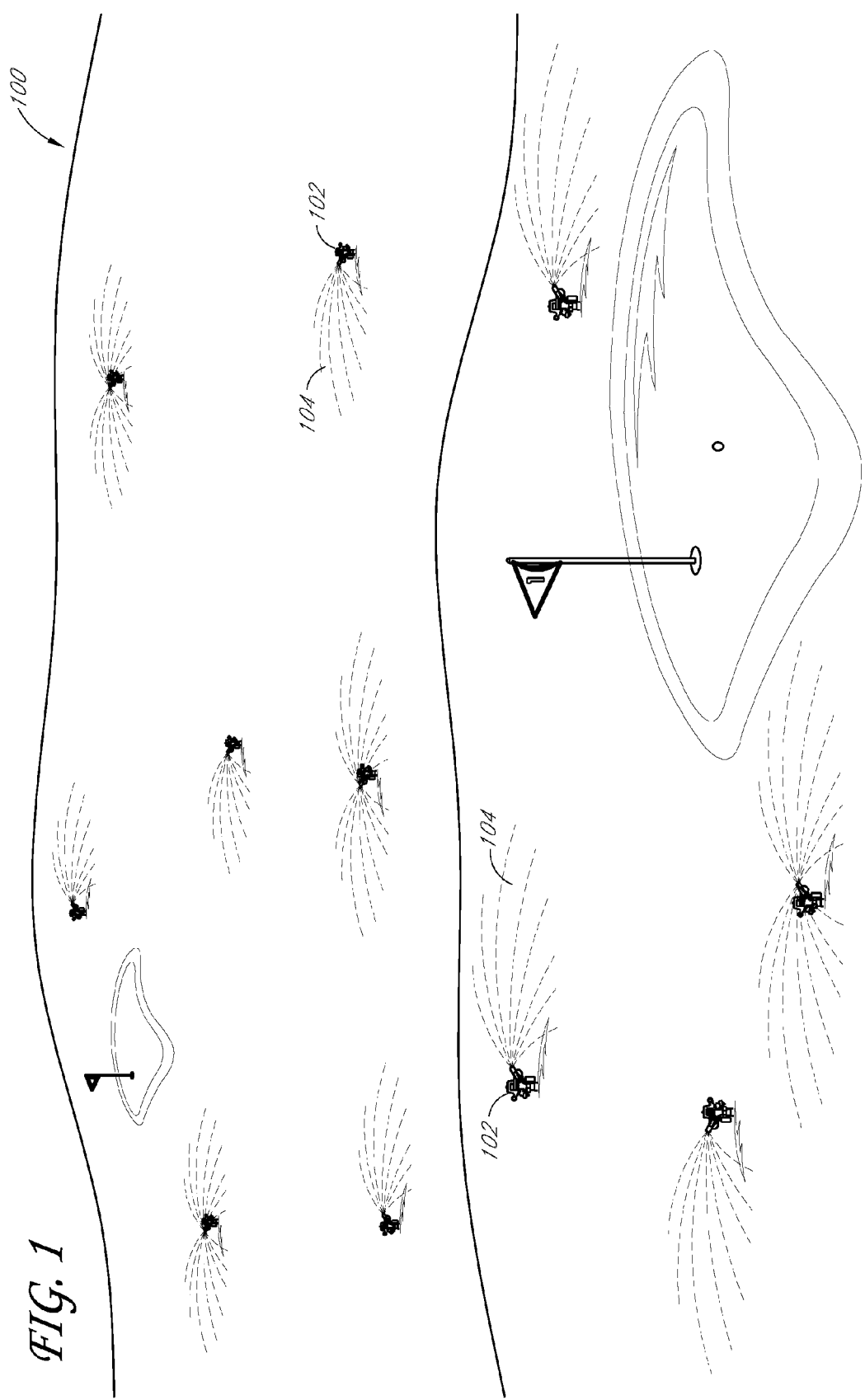
FIG. 1 shows a multi-zone sprinkler system.

FIG. 1 illustrates a golf course as one exemplary application for one embodiment of a multi-zone sprinkler system 100. Other exemplary applications include, but are not limited to, recreational parks, home lawns, theme parks, cemeteries, farms, nurseries, and any other setting that provides water to vegetation through an automatic watering system. FIG. 1 illustrates a plurality of sprinklers 102, each having an electronically configurable spray pattern 104.

Figure 2:
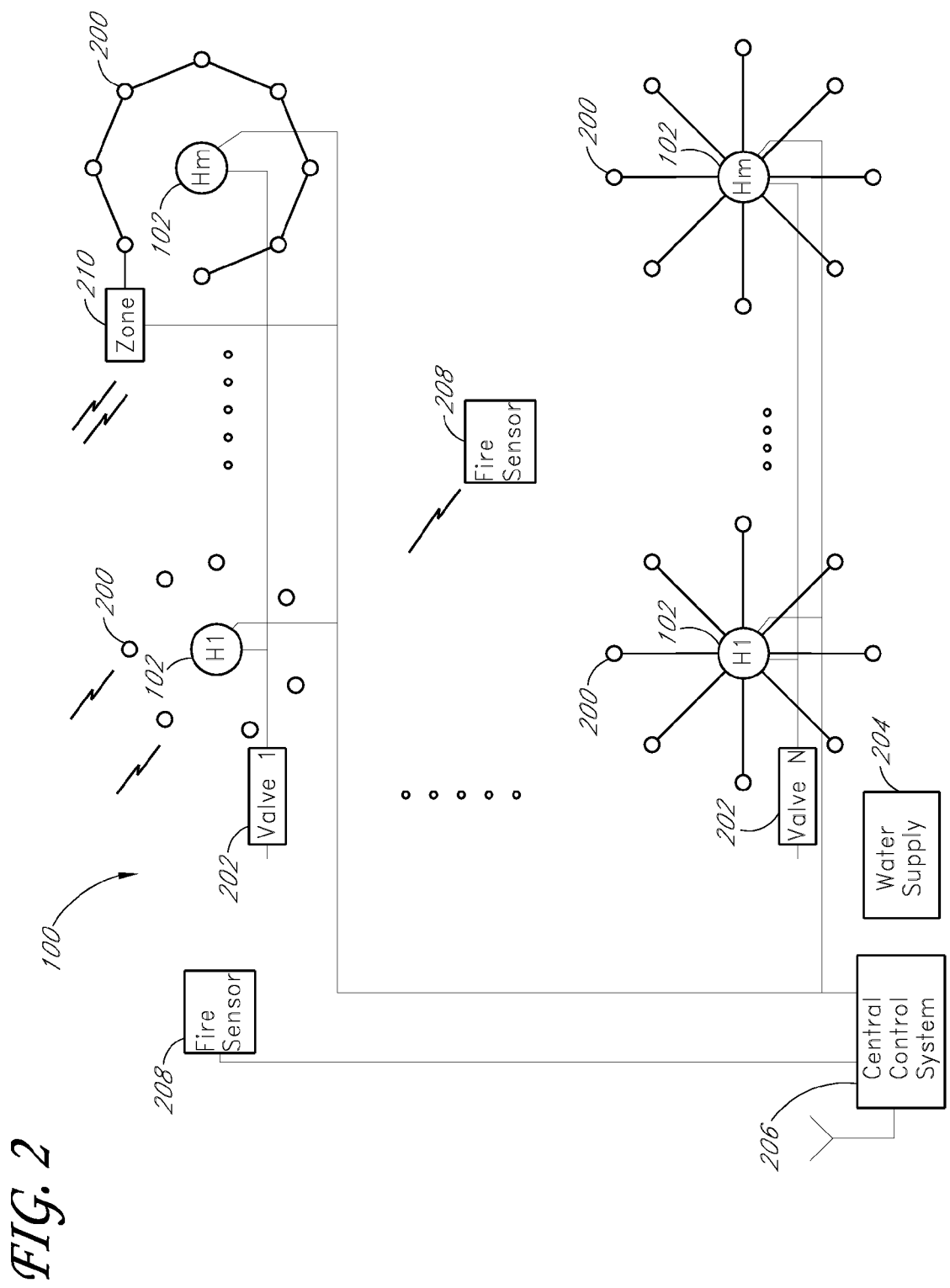
FIG. 2 is a schematic diagram of a multi-zone sprinkler system.

FIG. 2 is a schematic diagram of one embodiment of the multi-zone sprinkler system 100. The sprinkler system 100 includes the sprinklers 102, moisture sensors 200, water supply valves 202, a water supply 204, and a central control system 206.

In a typical arrangement, a series of water supply valves 202 each connect to the water supply 204. Each water supply valve 202 connects to a series of sprinklers 102, each sprinkler 102 having the configurable spray pattern 104. When a switch or solenoid in the water supply valve 202 activates, the water from the water supply 204 flows through the water supply valve 202. Depending on the spray pattern 104 of the sprinkler 102, the sprinkler 102 waters some, all, or none of the area surrounding the sprinkler 102. In one embodiment, the sprinkler system 100 is arranged in watering zones.

In one embodiment, the water supply can include fertilizer, weed control solution, or any other soluble compound the user desires to apply to the area associated with the sprinkler system 100.

In other arrangements, the multi-zone sprinkler system 100 includes at least one water control valve 202, and at least one sprinkler 102 having a configurable spray pattern 104.

The moisture sensors 200 are buried in the soil to sense the moisture in the soil. In one embodiment, the moisture sensors 200 form a circular or semi-circular arrangement around each sprinkler 102. The moisture sensors 200 transmit data indicating the moisture content of the soil to the central control system 206. In one embodiment, the moisture sensors 200 transmit data to the central control system via a radio frequency (RF) link, or other wireless transmission system.

In another embodiment, the moisture sensors 200 electrically connect to the sprinklers 102 and the sprinklers 102 communicate with the central control system 206 via the wireless transmission system. The moisture sensors 200 collect the moisture data and transmit the moisture data through the electrical connection to the sprinklers 102. The sprinklers 102 transmit the moisture data via the wireless transmission system, such as the RF link, to the central control system 206.

In another embodiment, the moisture sensors 200 electrically connect to the sprinklers 102 and the sprinklers 102 electrically connect to the central control system 206. The moisture sensors 200 collect the moisture data and transmit the moisture data through the electrical connection to the sprinklers 102. The sprinklers 102 transmit the moisture data through the electrical connection to the central control system 206.

In another embodiment, the multi-zone sprinkler system 100 further includes a zone controller 210. The moisture sensors 200 located in the zone controlled by the zone controller 210 transmit the moisture data to the zone controller 210. The zone controller 210 transmits the moisture data to the central control system 206.

In one embodiment, the moisture sensors 102 transmit the moisture data via a wireless transmission system, such as, for example, the RF link, to the zone controller 210. In another embodiment, the moisture sensors 200 electrically connect to the zone controller 210. Each moisture sensor 200 can be individually wired to the zone controller 210, or groups of moisture sensors 200 can be wired in a consecutive pattern, i.e., daisy chained, and the last moisture sensor 200 in the chain electrically connects to the zone controller 210. The moisture sensors 200 transmit the moisture data to the zone controller 210 through the electrical connection.

In one embodiment, the zone controller 210 communicates with the central control system via the wireless transmission system, such as, for example, the RF link, and transmits the moisture data via the wireless transmission system to the central control system 206. In another embodiment, the zone controller 210 electrically connects to the central control system 206, and transmits the moisture data to the central control system 206 through the electrical connection.

Based on the moisture data, the central control system 206 decides how much water to put down in each zone. The central control system 206 activates the water control valves 202, which permits water from the water supply 204 to flow through the water control valves 202. Further, based on the moisture data, the central control system 206 configures the electrically configurable spray pattern 104 of the sprinklers 102.

The central control system 206 includes one or more computers. The computers include, by way of example, processors, program logic, or other substrate configurations representing data and instructions, which operate as described herein. In other embodiments, the processors can include controller circuitry, processor circuitry, processors, general-purpose single-chip or multi-chip microprocessors, digital signal processors, embedded microprocessors, microcontrollers and the like.

The central control system 206 includes information relating to the locations of the sprinklers 200, the area watered or the maximum spray pattern of each sprinkler 200, watering zones controlled by each zone controller 210, and the like.

The central control system 206 processes the moisture data to determine which areas require moisture. The central control system 206 transmits instructions to configure the spray pattern 104 of the sprinklers 102, such that the areas requiring moisture are watered, and the areas not requiring moisture are not watered.

In one embodiment, the central control system 206 transmits instructions to the zone controller 210 through the wireless transmission system or the electrical connection, as described above. The zone controller 210 then transmits the instructions to the sprinkler 200 through the wireless transmission system or the electrical connection, as described above.

In another embodiment, the central control system 206 transmits instructions directly to the sprinkler 102 through the wireless transmission system or the electrical connection, as described above.

In another embodiment, the multi-zone sprinkler system 100 further includes fire sensors 208. The fire sensors 208 are, for example, smoke detectors, infrared detectors, ultraviolet (UV) detectors, infrared cameras, temperature sensors, or the like. The fire sensors 208 transmit fire data to the central control system 206 directly or through the zone controller 210 through the wireless transmission system or an electrical connection, as described above. Based on the fire data, the central control system 206 transmits instructions to configure the spray pattern 104 of the sprinklers 102, as described above, such that the areas requiring moisture are watered.

Figure 3:
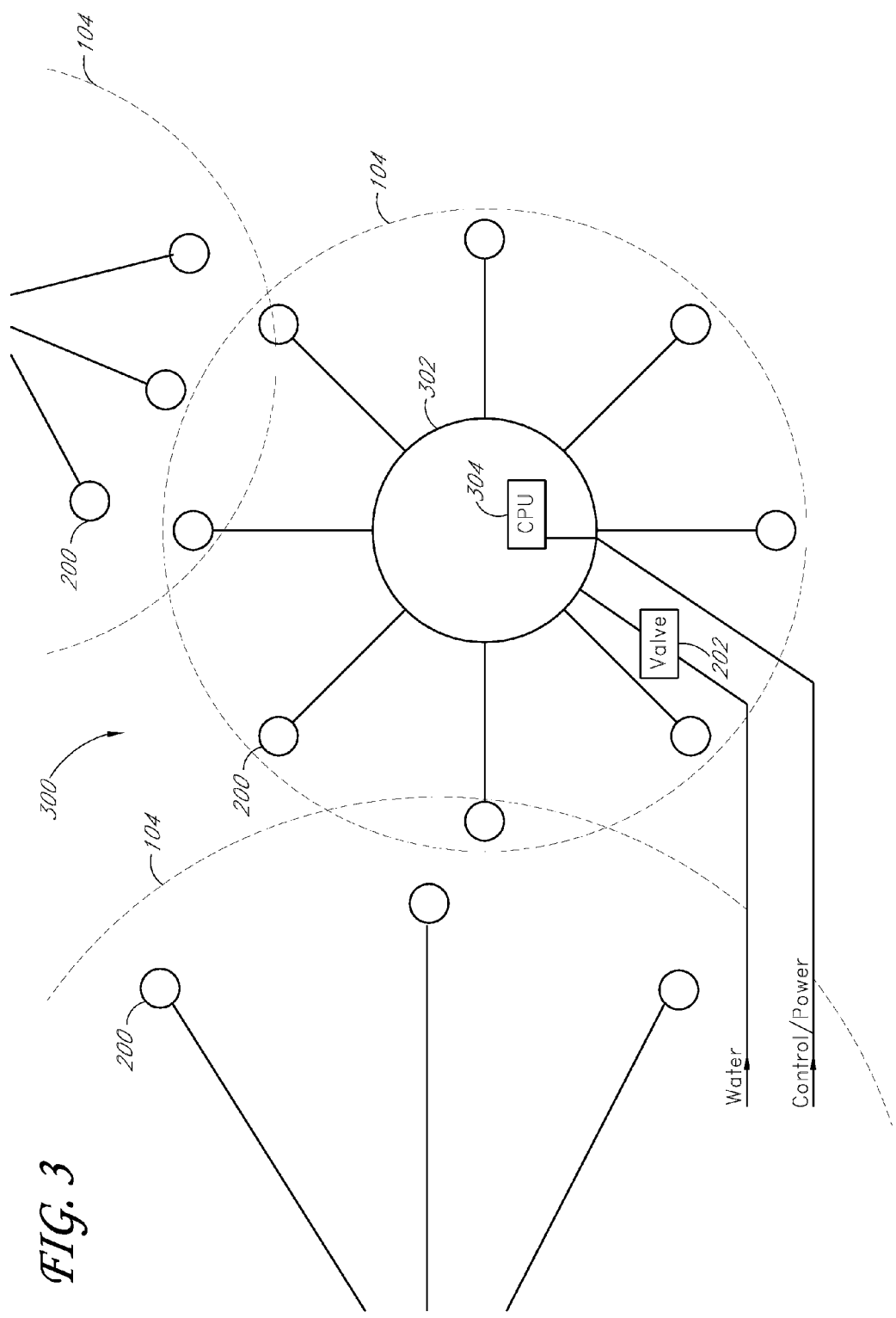
FIG. 3 shows an adjustable-pattern sprinkler head with associated moisture sensors.

FIG. 3 is a schematic diagram of a sprinkler system 300. The sprinkler system 300 includes the sprinkler 102 having the configurable spray pattern 104, and the moisture sensors 200. The sprinkler 102 includes a sprinkler head 302, which includes at least one computer 304.

The computer 304 includes, by way of example, processors, program logic, or other substrate configurations representing data and instructions, which operate as described herein. In other embodiments, the processors can include controller circuitry, processor circuitry, processors, general-purpose single-chip or multi-chip microprocessors, digital signal processors, embedded microprocessors, microcontrollers and the like.

The sprinkler head 302 receives water when the water control valve 202 activates. The computer 304 receives control data and power from a central location, such as the central control system 206. In another embodiment, the computer 304 receives only power from the central location.

At least one moisture sensor 200 is associated with and electrically connects to the sprinkler head 302. In one embodiment, a plurality of moisture sensors 200 forms a circular pattern around the sprinkler head 300.

The moisture sensors 200 transmit the moisture data to the computer 304. In one embodiment, the computer 304 transmits the moisture data to the central control system 206 and receives instructions to configure the spray pattern 104 from the central control system 206. In another embodiment, the computer 304 receives the moisture data, processes the moisture data to determine the correct spray pattern 104, and configures the spray pattern 104 based on the moisture data.

FIG. 3 illustrates the spray patterns 104 partially overlapping. In another embodiment, the spray patterns 104 do not overlap. In a further embodiment, the spray patterns 104 overlap, such that the area of the sprinkler system 300 is watered by at least one sprinkler 102.

Figure 4:
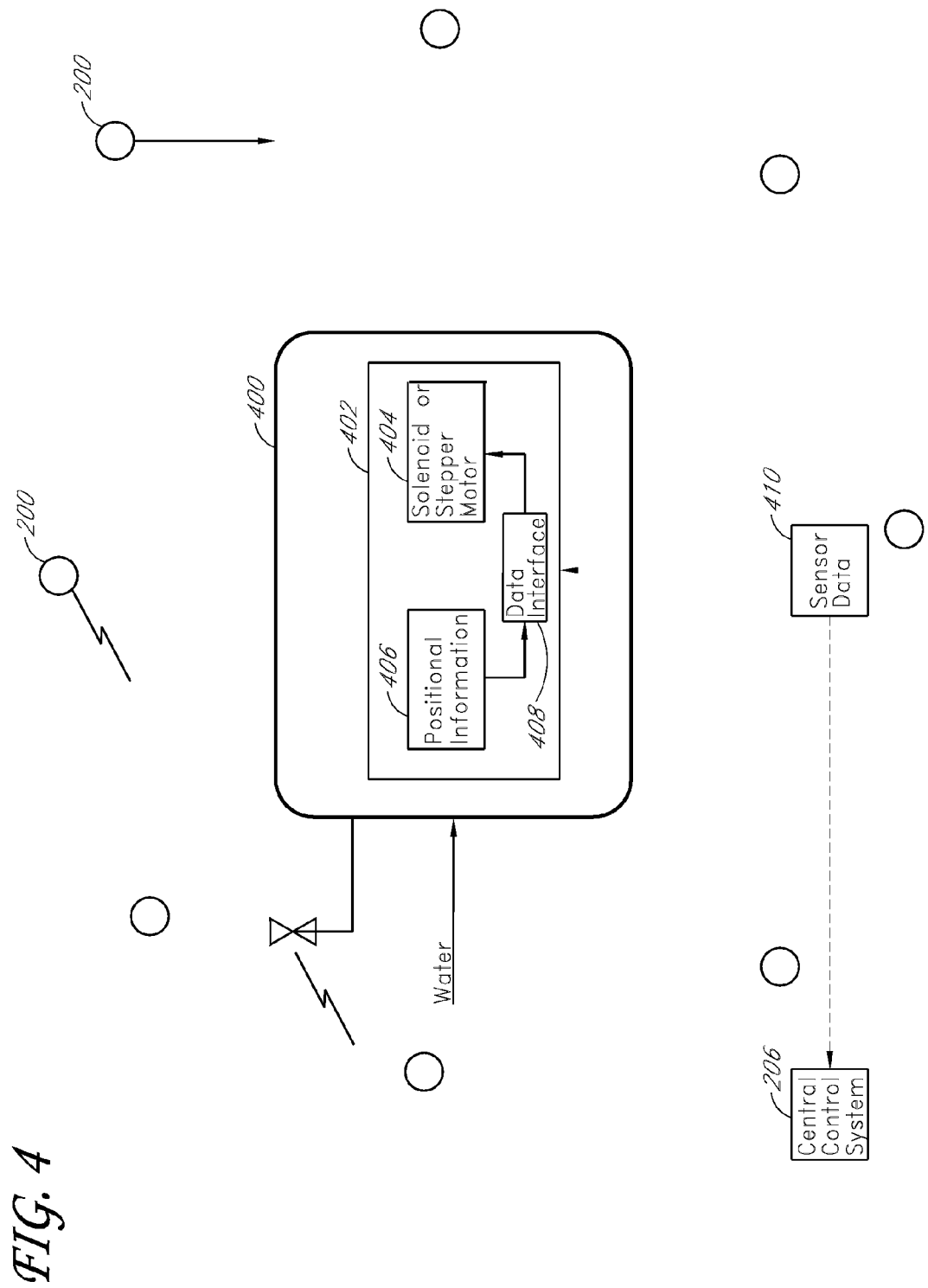
FIG. 4 is a block diagram of a rotating sprinkler with controllable rotation rates.

FIG. 4 is a schematic diagram of one embodiment of a rotating sprinkler 400. The rotating sprinkler 400 rotates in a 360E arc, or portions of the 360E arc, when water flows through the sprinkler 400. The rate of rotation through various portions of the arc determines the quantity of water applied to the area surrounding the sprinkler 400. As the sprinkler slowly rotates, the sprinkler 400 applies more water. When the sprinkler 400 rotates quickly, less water is applied.

The sprinkler 400 includes a sprinkler head 402. The sprinkler head 402 includes an actuator 404, positional information 406, and a data interface 408. The positional information 406 received through the data interface 408 controls the activation of the actuator 404. The actuator 404 controls the rate of rotation of the sprinkler head 402. Typically, the sprinkler 400 would be used in a golf course or other industrial application with rotating sprinklers.

In one embodiment, when the actuator 404 is open or active, the sprinkler head 402 rotates quickly. In another embodiment, when the actuator 404 is closed or inactive, the sprinkler head 402 rotates slowly.

The water supply 204, through the activated water supply valve 202, supplies water to the sprinkler 400. The moisture sensor 200 sends moisture data 410 to the central control system 206 directly or through the sprinkler 400 via the wireless transmission system or electrical connections, or a combination of the wireless transmission system or the electrical connections.

Based on the moisture data 410, the central control system 206 sends positional information 406 through the data interface 408 to the sprinkler 400 via the wireless transmission system or electrical connections, or a combination of the wireless transmission system or the electrical connections. Using the positional information, the sprinkler 400 opens or closes the actuator 404 to control the speed at which the sprinkler head 402 rotates.

In another embodiment, the sprinkler 400, using the computer 302, determines the positional information 406 based on the moisture data 410. Using the positional information from the computer 302, the sprinkler 400 opens or closes the actuator 404 to control the rate of rotation of the sprinkler head 402.

Figure 5:
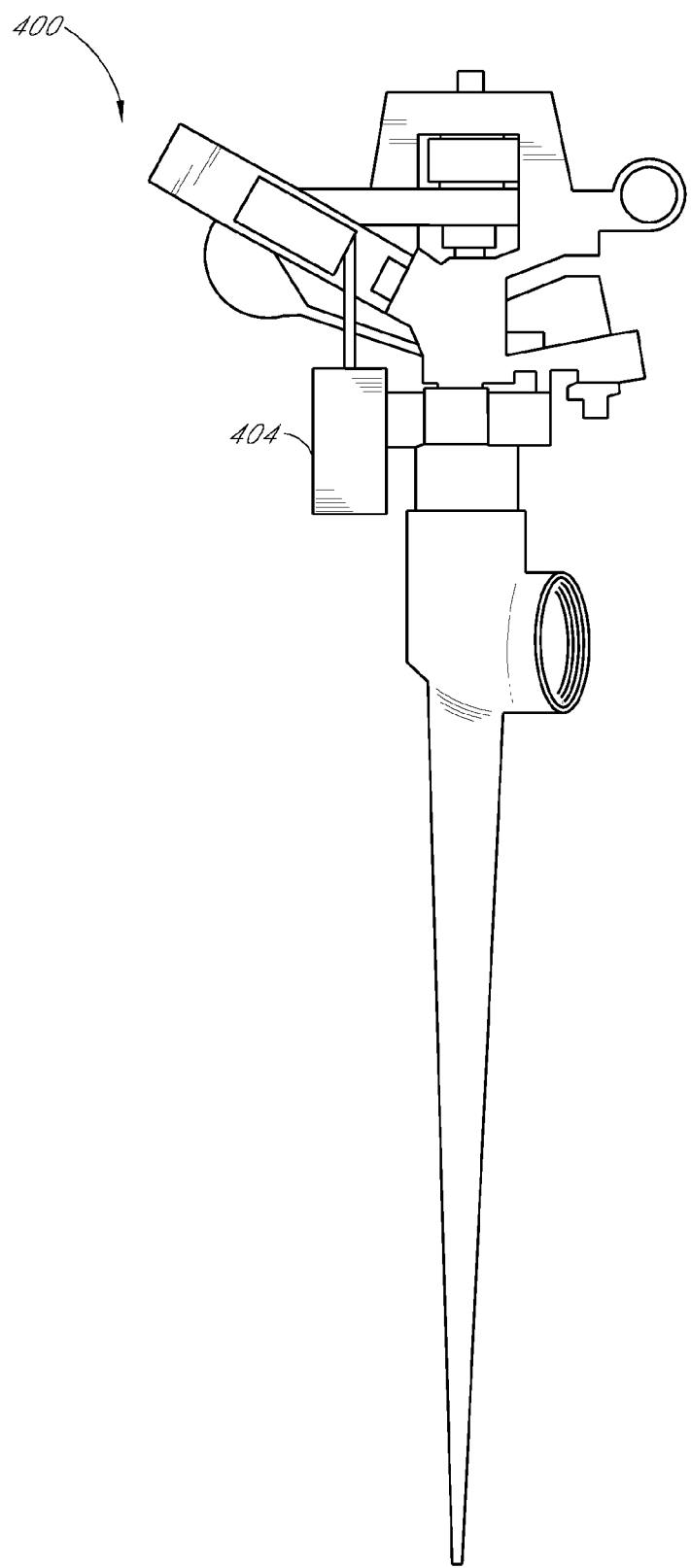
FIG. 5 shows a rotating sprinkler with an actuator to control rotation speed.

FIG. 5 is a schematic diagram of one embodiment of the sprinkler 400 comprising the actuator 404. The actuator 404 can be, for example, a solenoid, a stepper motor, a switch, a relay, a valve, or the like.

Figure 6:
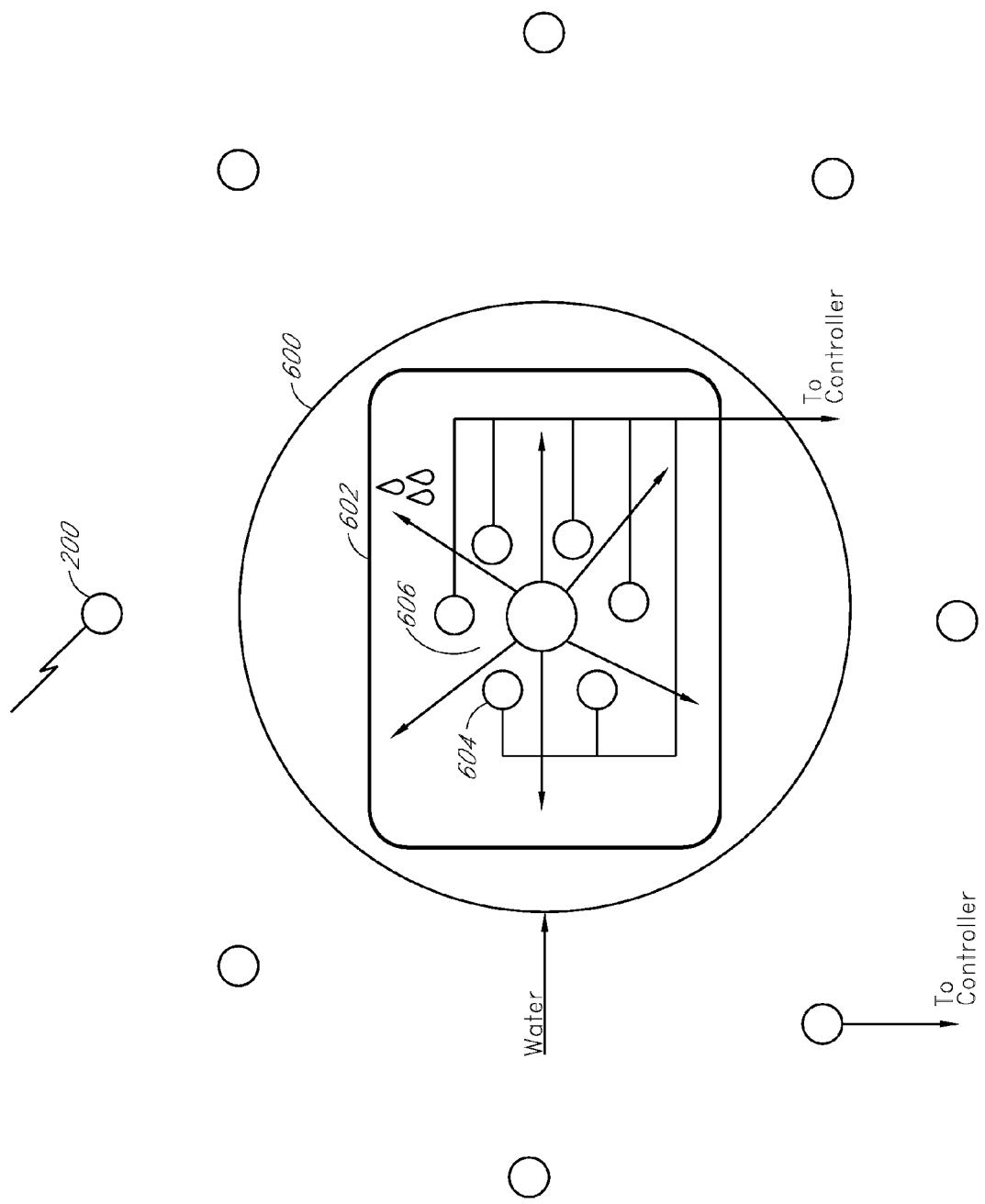
FIG. 6 is a schematic diagram of a non-rotating sprinkler head with an adjustable spray pattern.

FIG. 6 is a schematic diagram of one embodiment of a non-rotating sprinkler 600. The sprinkler 600 includes a sprinkler head 602. The sprinkler head 602 includes at least one solenoid 604 having an active state and an inactive state. Each solenoid 604 controls a port 606 associated with the solenoid 604. In one embodiment, the solenoids 604 and their associated ports 606 form a ring around the perimeter of the sprinkler head 602. For example, eight solenoids could be used to control eight zones of a circular patterns around the sprinkler 600. Typically, the sprinkler 600 would be used in a residential application or other application with non-rotating sprinklers.

The water supply 204 through the activated water supply valve 202 supplies water to the sprinkler 600. When the port 606 is open, water flows through the port 606.

In one embodiment, when the solenoid 604 is active, the port 606 is open. In another embodiment, when the solenoid 604 is active, the port 606 is closed. In another embodiment, when the solenoid 604 is inactive, the port 606 is closed. In a yet further embodiment, when the solenoid 604 is inactive, the port 606 is open.

Based on the moisture data 410, the central control system 206 sends state information to the sprinkler 600 to control the state of the solenoids 604. The solenoids 604 open the ports 606 as determined by the state information. The sprinkler 600 waters the area associated with the open ports 606.

In another embodiment, the sprinkler 600, using the computer 302, controls the state of the solenoids 604 based on the moisture data 410. The sprinkler 600 activates the solenoids 604 to open the ports 606, which waters the areas associated with the open ports 606.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

What is claimed is:

1. A sprinkler system comprising:
a rotating sprinkler head having a configurable spray pattern, wherein said sprinkler head is configured to rotate through an arc;
a first moisture sensor provided in a zone watered by said sprinkler head, said first moisture sensor associated with a first portion of the arc and configured to collect moisture data in the zone;
a second moisture sensor provided in the zone, said second moisture sensor associated with a second portion of the arc and configured to collect moisture data in the zone; and
a controller configured to obtain the moisture data and configure the spray pattern of the sprinkler head based on the moisture data, wherein the controller is configured to configure the spray pattern at least in part by controlling the rate of rotation of said sprinkler head, wherein the controller is configured to reduce the rate of rotation of the sprinkler head when the sprinkler head is passing through said first portion of the arc that the moisture data indicate to be less moist and to increase the rate of rotation of the sprinkler head when the sprinkler head is passing through said second portion of the arc that the moisture data indicate to be more moist.

2. The sprinkler system of claim 1, wherein the sprinkler head further comprises an actuator, wherein the spray pattern is controlled by controlling the actuator.

3. The sprinkler system of claim 1, wherein the sprinkler head further comprises an actuator, wherein the state of the actuator determines rate of rotation of the sprinkler head.

4. The sprinkler system of claim 2, wherein the controller determines the state of the actuator.

5. The sprinkler system of claim 1, further comprising one or more fire sensors.

6. The sprinkler system of claim 1, wherein the controller obtains the moisture data through a wireless transmission link.

7. The sprinkler system of claim 1, wherein the controller is electrically connected to the moisture sensors.

8. The sprinkler system of claim 1 wherein the controller comprises a zone controller, the zone controller configured to receive said moisture data and provide the moisture data to a central controller.

9. The sprinkler system of claim 1, wherein said sprinkler head comprises said controller.

10. The sprinkler system of claim 1, wherein said controller comprises a zone controller that controls a plurality of sprinkler heads.

11. A sprinkler system comprising:
    means for collecting moisture data in pattern areas associated with a rotating sprinkler head, said pattern areas further associated with different portions of an arc; and
    means for automatically configurable spray pattern associated with the sprinkler head based on the moisture data by reducing the rate of rotation of said sprinkler head when the sprinkler head is passing through portions of the arc that the moisture data indicate to be less moist and means for increasing the rate of rotation of said sprinkler head when the sprinkler head is passing through portions of the arc that the moisture data indicate to be more moist.

12. A method of watering comprising:
    obtaining moisture data from a plurality of moisture sensors associated with a rotating sprinkler head and further associated with different portions of an arc; and
    automatically configuring a configurable spray pattern associated with the sprinkler head based on the moisture data wherein the spray pattern is automatically configured at least in part by reducing the rate of rotation of the sprinkler head when the sprinkler head is passing through portions of the arc that the moisture data indicate to be less moist and increasing the rate of rotation of the sprinkler head when the sprinkler head is passing through portions of the arc that the moisture data indicate to be more moist.

13. A sprinkler comprising:
    means for obtaining moisture data from a plurality of moisture sensors associated with a rotating sprinkler head and further associated with different portions of an arc; and
    means for dynamically configuring a configurable spray pattern associated with the sprinkler head based on the moisture data by reducing the rate of rotation of said sprinkler head when the sprinkler head is passing through portions of the arc that the moisture data indicate to be less moist and means for increasing the rate of rotation of said sprinkler head when the sprinkler head is passing through portions of the arc that the moisture data indicate to be more moist.

14. A sprinkler system comprising:
    a rotating sprinkler head having a configurable spray pattern, wherein said sprinkler head is configured to rotate through an arc;
    a plurality of moisture sensors provided in a zone watered by said sprinkler head, each of said moisture sensors associated with at least one portion of said arc, said moisture sensors configured to collect moisture data in the zone; and
    a controller configured to obtain the moisture data and configure the spray pattern of the sprinkler head based on the moisture data, wherein the controller is configured to configure the spray pattern at least in part by controlling the rate of rotation of said sprinkler head, wherein the controller is configured to reduce the rate of rotation of the sprinkler head when the sprinkler head is passing through portions of the arc that the moisture data indicate to be less moist and to increase the rate of rotation of said sprinkler head when the sprinkler head is passing through portions of the arc that the moisture data indicate to be more moist.

15. The sprinkler system of claim 14, wherein the sprinkler head further comprises an actuator, wherein the spray pattern is controlled by controlling the actuator.

16. The sprinkler system of claim 14, wherein the sprinkler head further comprises an actuator, wherein the state of the actuator determines rate of rotation of the sprinkler head.

17. The sprinkler system of claim 15, wherein the controller determines the state of the actuator.

18. The sprinkler system of claim 14, further comprising one or more fire sensors.

19. The sprinkler system of claim 14, wherein the controller obtains the moisture data through a wireless transmission link.

20. The sprinkler system of claim 14, wherein the controller is electrically connected to the moisture sensors.

21. The sprinkler system of claim 14, wherein the controller comprises a zone controller, the zone controller configured to receive said moisture data and provide the moisture data to a central controller.

22. The sprinkler system of claim 14, wherein said sprinkler head comprises said controller.

23. The sprinkler system of claim 14, wherein said controller comprises a zone controller that controls a plurality of sprinkler heads.

* * * * *

UNITED STATES PATENT AND TRADEMARK OFFICE
CERTIFICATE OF CORRECTION

PATENT NO. : 7,347,384 B2 Page 1 of 1
APPLICATION NO. : 11/620587
DATED : March 25, 2008
INVENTOR(S) : Lawrence Kates It is certified that error appears in the above-identified patent and that said Letters Patent is hereby corrected as shown below:

In Column 7 at line 35, in Claim 11, after "automatically" insert --configuring a--.

Signed and Sealed this

Sixteenth Day of December, 2008

JON W. DUDAS
*Director of the United States Patent and Trademark Office*